United States Patent [19]

Cloetens

[11] Patent Number: 5,249,116
[45] Date of Patent: Sep. 28, 1993

[54] DIGITAL CONTROL SYSTEM AND A SUB-CIRCUIT TO BE USED IN THE CONTROL SYSTEM

[75] Inventor: Henri Cloetens, Brussels, Belgium

[73] Assignee: U.S. Philips Corporation, New York, N.Y.

[21] Appl. No.: 735,493

[22] Filed: Jul. 25, 1991

[30] Foreign Application Priority Data

Feb. 28, 1991 [NL] Netherlands .......................... 9100368

[51] Int. Cl.⁵ .............................................. G05B 13/02
[52] U.S. Cl. ..................................... 364/148; 364/157
[58] Field of Search ............... 364/148, 161, 162, 525, 364/157, 572, 582, 574

[56] References Cited

U.S. PATENT DOCUMENTS

| | | | |
|---|---|---|---|
| 4,602,326 | 7/1986 | Kraus | 364/158 |
| 4,631,675 | 12/1986 | Jacobsen et al. | 364/148 |
| 5,072,357 | 12/1991 | Niessen et al. | 364/161 |
| 5,157,596 | 10/1992 | Alcone | 364/148 |

FOREIGN PATENT DOCUMENTS 0390467 10/1990 European Pat. Off. .

Primary Examiner—Jerry Smith
Assistant Examiner—Paul Gordon
Attorney, Agent, or Firm—Leroy Eason

[57] ABSTRACT

A digital control system includes an actuator (2) for controlling a state variable of a process, a sensor (3) for detecting the state variable, and an A/D converter (4) for converting the measured state variable into a series of m-bit digital signal words I(k). These are processed by a digital processor (5) which includes a digital subcircuit (6) for normalizing the signal words I(k) and/or stablizing the gain of the control system. The subcircuit (6) includes a comparator circuit (21) which receives at an input thereof a series of m-bit signal words a(k) related to the series of measured signal words I(k), the converter being in series with an integrating filter (24) and a quantizing circuit (25). A multiplier (20) is connected in a negative feedback path from the output of the subcircuit to another input of the comparator (21). A series of p-bit output signal words is produced at the output of the quantizing circuit having a low frequency component equal to the quotient of the series of m-bit signal words a(k) divided by a multi-bit signal word b supplied to another input of the multiplier (20). The number of bits p per signal word at the output of the subcircuit is strongly reduced relative to the number of bits m per signal word a(k), so that only a limited number of components are required in the multiplier and also the total number of components of the subcircuit is reduced. Such a control system may be employed to control focusing and tracking of the scanning beam in optical recording and/or reproducing apparatus.

6 Claims, 4 Drawing Sheets

DIGITAL CONTROL SYSTEM AND A SUB-CIRCUIT TO BE USED IN THE CONTROL SYSTEM

BACKGROUND OF THE INVENTION

1. Field of the Invention

The invention relates to a digital control system, comprising an actuator for influencing a state variable in a process, a sensor for detecting the state variable, a converter for converting the detected state variable into a series of digital measured signal values, a digital signal processor for deriving an actuator control signal from the series of measured signal values.

The invention further relates to a digital sub-circuit to be used in the digital control system.

2. Description of the Related Art

A digital control system as described is known, for example, from European Patent Application 0 390 467. The digital control system described in that document relates to focus control and tracking control in an optical recording and/or reproducing apparatus, in which an optical record carrier is scanned by a radiation beam for recording and/or reproducing purposes. The focus error signal and the tracking error signal are then derived from the radiation beam reflected by the record carrier. The magnitude of the focus error signal and the tracking error signal is strongly related to the intensity of the reflected radiation beam. This intensity strongly depends on the intensity of the radiation source used and on the reflection of the record carrier. Since these parameters may vary considerably there is a need for rendering the loop gain of the control system electronically adjustable and/or normalizing the error signals by dividing the focus error signal by the intensity of the detected radiation beam.

Optical recording and/or reproducing apparatus are know in which the normalization and/or adjustable gain are realised by means of analog multiplication using analog sub-circuits. In optical recording and/or reproducing apparatus having digital focus and tracking controls, there is a problem in that digital multiplier circuits and/or digital sub-circuits are necessary for gain adjustment and/or normalization in digital control loops. The prior art digital multiplier circuits and the digital sub-circuits, however, are disadvantageous in that they need very many components. This is especially a disadvantage in integrated circuits because the large number of components requires a relatively large chip surface and so results in increased cost of such an integrated circuit.

SUMMARY OF THE INVENTION

It is an object of the invention to provide a digital control system in which normalization of error signals and adjustment of the gain are achieved with digital circuits having relatively few components.

In a digital control system according to the invention the signal processor comprises a digital sub-circuit which has a first input for receiving a series of m-bit signal values which are related to the measured signal values, a second input for receiving an n-bit signal value, and an output at which it produces a series of p-bit output signal values which are indicative of the quotient of the series of m-bit signal values on the first input and the signal value on the second input. The signal processor also includes means for generating a control signal related to the series of signal values at the output of p-bit output the sub-circuit, a multiplier which has a first input coupled to the output of the sub-circuit, second input coupled to the second input of the sub-circuit, and an output at which is produced a series of signal values corresponding to the product of the output signal values and the signal values on the second input. The multiplier output is coupled to a first input of a comparing circuit, a second input of the comparing circuit being coupled to the first input of the signal processor. The output of the comparing circuit is coupled to an input of a quantizing circuit for converting the series of signal values on its input into a quantized series of p-bit signal values, p-being smaller than n. The output of the quantizing circuit is coupled to the output of the sub-circuit, the loop formed by the further comparing circuit, quantizing circuit and multiplier, comprising an integrating filter.

The sub-circuit adapts the output signal in such a way that the low-frequency component of the series of signal values at the output of the multiplier is maintained equal to the low-frequency component of the series of signal values at the first input. That is to say, the low-frequency component of the output signal is equal to the quotient of the series of signal values at the first input divided by the signal value at the second input. Since the number of bits of the signal values at the output of the sub-circuit is small due to the quantization, a multiplier can be used having relatively few components. That is, the number of components required in a digital multiplier is strongly related to the number of bits of the signal values to be multiplied.

As a result of the quantization, the series of signal values at the output of the sub-circuit will be strongly affected by noise. However, if the frequency of the signal values generated at the output of the sub-circuit is much higher than the highest frequency component the series of signal values at the first input, the noise power will mainly be situated in the high-frequency portion of the spectrum of the series of signal values at the output. The noise component power in the low-frequency spectrum will then be negligibly small relative to the signal power in this low-frequency portion of this spectrum. This means that the noise resulting from the quantization can be cancelled without affecting the low-frequency component in the sub-circuit output signal.

The sub-circuit comprises a negative feedback loop, so that the sub-circuit may be brought from a stable to an unstable state when a sign inversion of a signal value occurs at the second input. Such sign inversion changes the negative feedback into unstable positive feedback, so that the sub-circuit cannot be used in an unqualified manner for any signal value on the second input. This problem can be resolved by an embodiment of the invention characterized in that p is equal to 1.

An extremely simple multiplier may be used in the case where the quantizing circuit converts the signal on its input into a 1-bit signal value. In that case a 1-bit multiplier will be sufficient.

A further embodiment of the control system according to the invention is characterized in that the output of the sub-circuit is coupled to the input of the actuator only over an analog signal path. The output signal of the sub-circuit then directly drives the actuator, no additional digital-to-analog converter being necessary. Owing to the presence of high-frequency noise in the output signal the output of the sub-circuit should preferably be connected to the actuator through a low-pass filter.

The digital sub-circuit is pre-eminently suitable for use in control systems. However, the use of the digital sub-circuit is not restricted to control systems. The sub-circuit may, in essence, be used whenever a series of digital signal values is to be divided by an adjustable devisor, as, for example, for the normalization of digitized audio and/or video signals.

The invention will be further explained below with reference to the FIGS. 1 to 10, in which.

DESCRIPTION OF THE PREFERRD EMBODIMENTS

Figure 1:
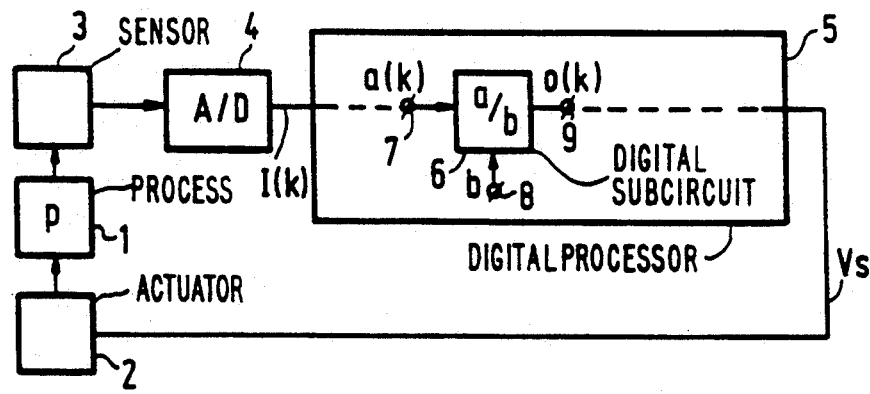
FIG. 1 shows a general block diagram of the digital control system according to the invention.

FIG. 1 shows a general block diagram of a digital control system according to the invention. The control system is applicable to a process 1 whose state variable, for example, a position of an object, may be influenced by an actuator 2. A sensor 3 detects the value of the state variable and the converter 4 converts the detected value of the state variable into a series of digital measured signal values $I(k)$. A digital signal processor 5 derives a control signal Vs for the actuator 2 from the series of measured signal values $I(k)$ according to a specific control criterion. The digital processor 5 comprises a digital sub-circuit 6. The digital sub-circuit 6 has an input 7 for receiving a series of m-bit signal values $a(k)$ related to the series of digital measured signal values $I(k)$ produced by the converter 4. The sub-circuit 6 has a further input 8 for receiving an a multi-bit signal value b. The sub-circuit has an output 9 at which a series of p-bit output signal values $a(k)$ are produced which are indicative of the quotient $a(k)/b$ of the series of signal values $a(k)$ on the input 7 and the signal value b on the input 8.

Figure 2A:
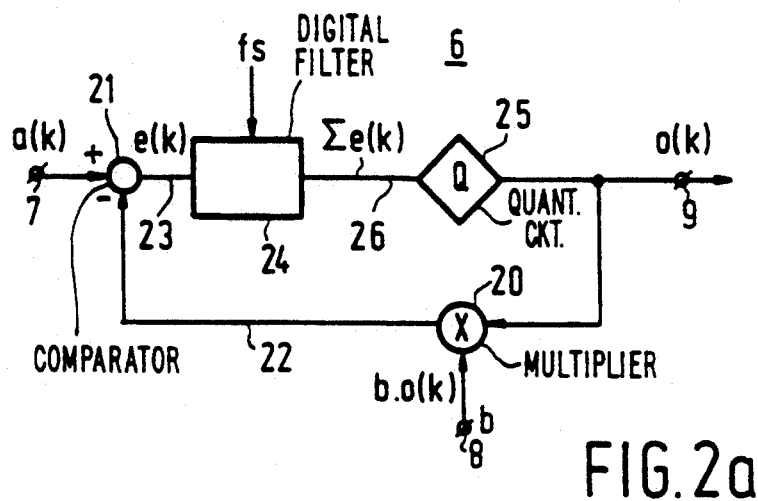
FIGS. 2a and 2b show embodiments of the digital sub-circuit according to the invention.

FIG. 2a shows a first embodiment of the digital sub-circuit 6. This sub-circuit comprises a multiplier 20 whose inputs are connected to the output 9 and input 8 respectively. The output of the multiplier 20 is coupled, for example, by means of an m-bit data bus 22, to one of the inputs of a comparing circuit 21. A further input of the comparing circuit 21 constitutes the input 7 of the sub-circuit 6. The comparing circuit 21 produces a series of m-bit signal values indicative of the difference $e(k)$ between the series of m-bit signal values $a(k)$ at input 7 and the series of m-bit signal values at the output of the multiplier 20. Over an m-bit data bus 23 the series of digital signal values $e(k)$ are applied to a digital integrating filter 24.

Figure 8:
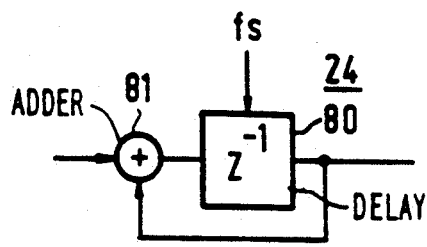
FIG. 8 shows an embodiment of a filter used in the sub-circuit.

The filter 24 may be a first-order or higher-order filter. FIG. 8 shows an embodiment of a first-order integral-action filter. This filter comprises a delay element 80, for example, a synchronous register controlled at a sample frequency fs. The output of the delay element 80 is fed back to a first input of an adder circuit 81. A second input of the adder circuit 81 operates as the input to the filter 24, whereas the output of the delay element operates as the output of the filter 24. The filter 24 produces a series of m-bit signal values $\Sigma e(k)$, for example, 12-bit signals, which are indicative of a summation of the series of signal values received at the input. The series of signal values $\Sigma e(k)$ at the output of the filter 24 is applied to a quantizing circuit 25, for example, over an m-bit data bus 26. The quantizing circuit 25 is a circuit of a customary type, converting the m-bit signal values $o(k)$ into p-bit signal values. The quantizing circuit 25 may comprise, for example, a circuit separating the p most significant bits from the signal values produced at the output. The p-bit signal values represented by these p bits are applied to the input 9 of the sub-circuit 6. The sub-circuit 6 forms a negative feedback system which has a low-frequency response curve owing to the integrating-action filter 24.

Owing to the negative feedback the low-frequency content of the series of output signal values $o(k)$ is equal to the low-frequency content of the series of signal values $a(k)$. This means that the low-frequency content of output the series of signal values $o(k)$ will be equal to the low-frequency content of the quotient $a(k)/b$.

Owing to the operation performed by the quantizing circuit 25 the noise power $P(r)$ in the series output signal values $o(k)$ will be large. However, if the bandwidth of the control loop is much smaller than the sample frequency fs of filter 24, the noise power will be especially concentrated in the high-frequency region of the spectrum of the series of output signal values $o(k)$.

Figure 3:
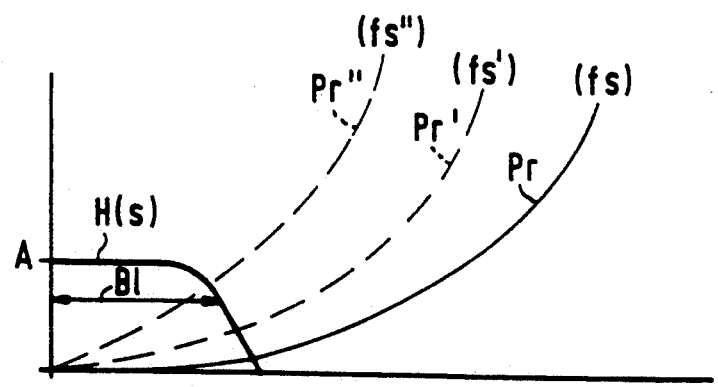
FIG. 3 shows the bandwidth of the control system and the power spectrum of the noise caused by the sub-circuit.

FIG. 3 shows by way of illustration a customary transfer characteristic Hs of a control system plotted against frequency f. The bandwidth which is, for example, 2 kHz, is referenced B1. FIG. 3 furthermore shows the noise power Pr, Pr' and Pr'' of the series $o(k)$ depicted as functions of the frequency f for the respective sample frequencies fs, fs' and fs'', where $fs > fs' > fs''$. FIG. 3 proves that the portion of the noise power Pr within the bandwidth B1 of the control system decreases according as the sample frequency increases. For a digital control loop having a bandwidth of 2 kHz very favourable results are achieved with a sub-circuit driven with a sample frequency fs equal to 2 MHz in combination with a quantizing circuit producing a series of 1-bit signal values $o(k)$ at the output 9.

Figure 4:
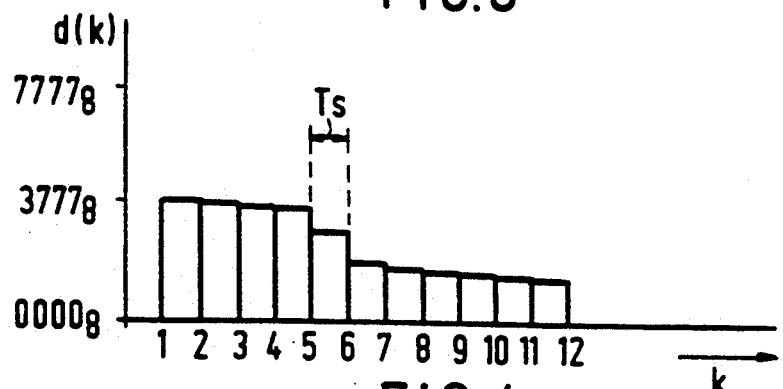
FIGS. 4 and 5 show series of signal values occurring at the output of the digital sub-circuit.

FIG. 4 shows as an illustrative example a series of 12-bit signal values $a(k)$ plotted against k. The values of $a(k)$ are represented in the octal number system. FIG. 4 further shows the time interval Ts $(=1/fs)$ between the signal values.

Figure 5:
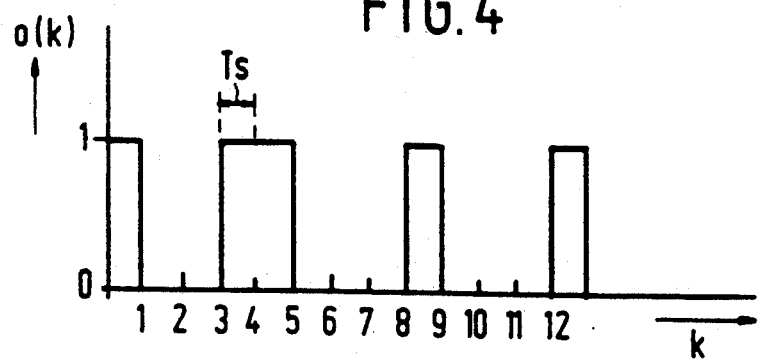

FIG. 5 shows a series of 1-bit signal values $o(k)$ plotted against k which is obtained if the series $a(k)$ is divided in the divider circuit by a constant value $b=1$.

Figure 6:
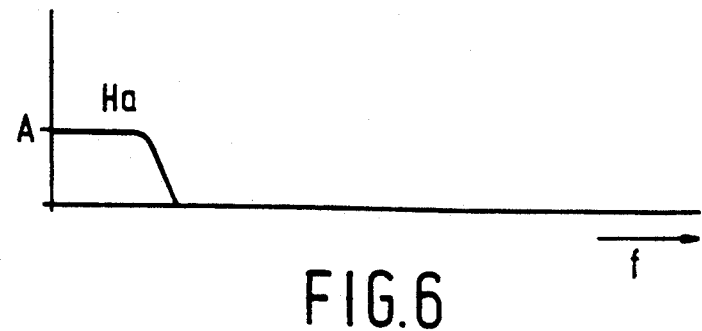
FIGS. 6 and 7 show the frequency spectrum of signals at the input and output of the sub-circuit.
Figure 7:
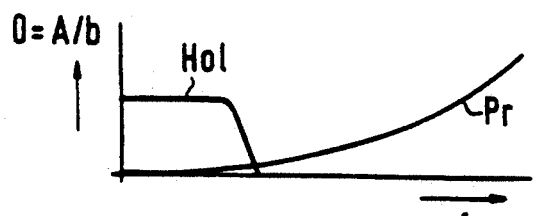

FIG. 6 shows a possible spectrum Ha of the series $a(k)$ plotted against frequency f. FIG. 7 shows the spectrum of the series of signal values $o(k)$. The spectrum of FIG. 7 shows a low-frequency portion Hol which is equal to the spectrum Ha divided by the value b. Furthermore, the spectrum comprises the noise component Pr which is situated, in essence, outside the region of the spectrum covered by the low-frequency component Hol.

The sub-circuit 6 forms a negative feedback system. This denotes that the necessary stability requirements must be satisfied for a proper functioning. For the subcircuit 6 shown in FIG. 2a this means that this circuit can only operate in a stable state for positive values of b on the input 8. Sign inversion of b will change the negative feedback into an unstable positive feedback.

Figure 2B:
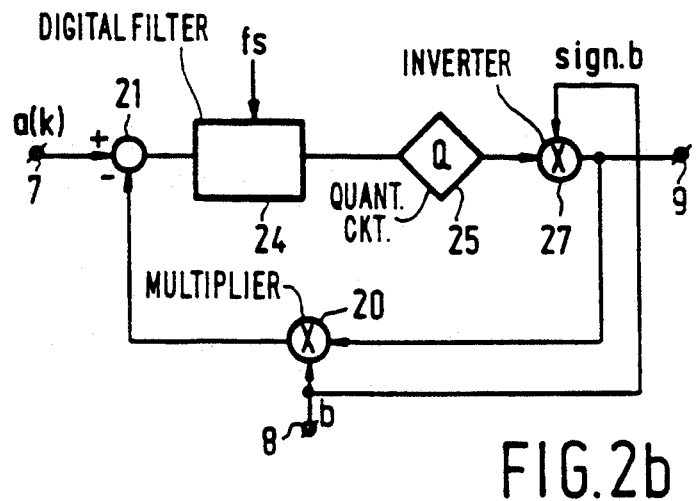

FIG. 2b shows an embodiment of the sub-circuit 6 in which the problem of instability is solved by inserting between the quantizing circuit 25 and the output 9 a circuit 27 which, depending on a signal(sign.b)which is indicative of the sign of the value of b, either inverts or does not invert the signal value at the output of the quantizing circuit 25. The circuit 27 may, for example be, a controllable inverter circuit of a customary type. By using circuit 27 it is achieved that a sign inversion of the signal value b does not have any effect on the negative feedback, and thus no effect on the stability of the sub-circuit 6.

The number of bits per output signal value produced by the quantizing circuit 25 is preferably small because, the complexity of the multiplier 20 is strongly related to the number of bits of the signal values on its input. An extremely simple multiplier 20 may be used if the number of bits per signal value at the output of the quantizing circuit is equal to 1. In that case AND gates may be used for the multiplier, which either apply or do not apply the signal value b to the comparing circuit 21 depending on to the logic value of the 1-bit signal values at the output 9.

Figure 9:
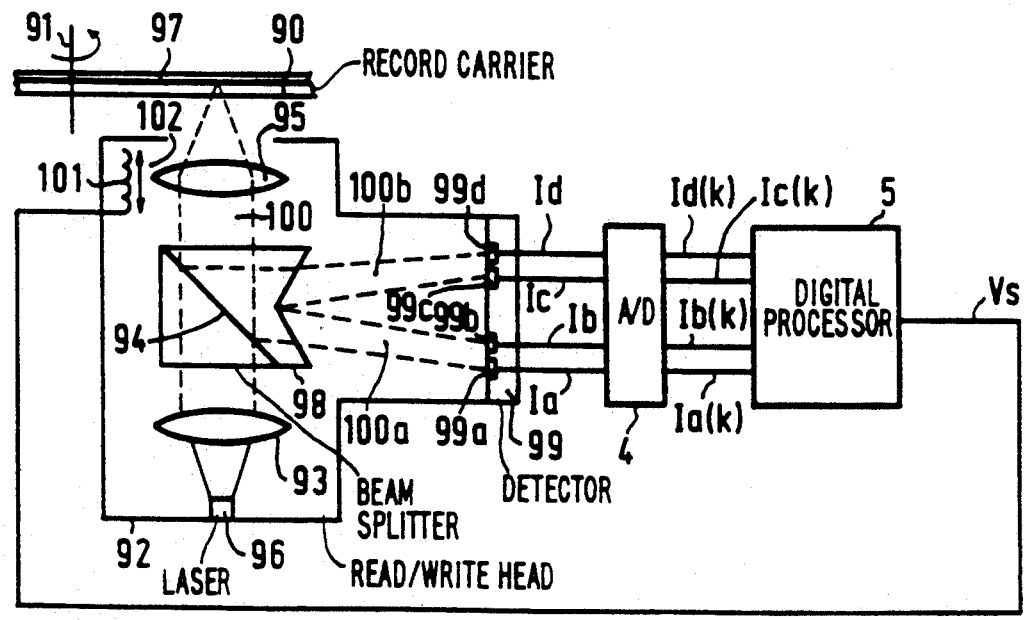
FIGS. 9 and 10 show an application of the digital control system to an optical reproducing apparatus.

The digital control system described above is preeminently suitable for control systems in which normalization of measured signals or loop gain adjustment is desired. An example of such a control system is the focus control in optical recording and/or reproducing apparatus. FIG. 9 shows a focus control included in such an optical recording and/or reproducing apparatus. In this Figure an optical record 90 carrier of a customary type rotates around its axis 91. Opposite to the rotating record carrier 90 is installed an optical read and/or write head 92 of a customary type. The head 92 comprises a radiation source for generating a radiation beam 100 which is focused at a reflecting information layer 97 of the record carrier 90 through an objective 93, a semi-transparent mirror 94 and a focus objective 95. The radiation beam reflected by the record carrier 90 is directed to a radiation-sensitive detector 99 through the semi-transparent mirror 94 and a beam splitter 98, for example, a pentagonal prism. At that point the beam 100 is split into two sub-beams 100a and 100b by the beam splitter 98. The detector 99 comprises a bank of four radiation-sensitive detectors 99a, 99b, 99c and 99d. The positions of the detectors 99a, ..., 99d are such that if the radiation beam 100 is focused on the information layer 97, the meeting surface of the beam 100a on the detector is symmetrical relative to the middle between the detectors 99a and 99b, and the meeting surface of the sub-beam 100b is symmetrical relative to the detectors 99c and 99d. The detectors 99a, ..., 99d produce four signal currents Ia, ..., Id which are indicative of the radiation power detected by the associated detectors.

A focus error signal Fe indicative of the distance between the focal point of the beam 100 and the information layer 97 may be derived from the signal currents according to the following formula:

$$Fe = \frac{Ia - Ib}{Ia + Ib} - \frac{Ic - Id}{Ic + Id}$$

In this equation the focus error signal Fe is normalized by the division of the differences (Ia−Ib) and (Ic−Id) by the respective sum values (Ia+Ib) and (Ic+Id). This normalization renders the focus error signal Fe independent of variations in the intensity of the reflected radiation beam. The signal currents Ia, Ib, Ic and Id are converted into respective series of digital signal values Ia(k), Ib(k), Ic(k) and Id(k) by the converter 4 and applied to digital signal processor 5. The signal processor derives therefrom a control signal Vs for an actuator 101 for shifting the focusing objective 95 in a direction denoted by an arrow 102 so that the radiation beam 100 is maintained in a position focused at the information layer 97.

Figure 10:
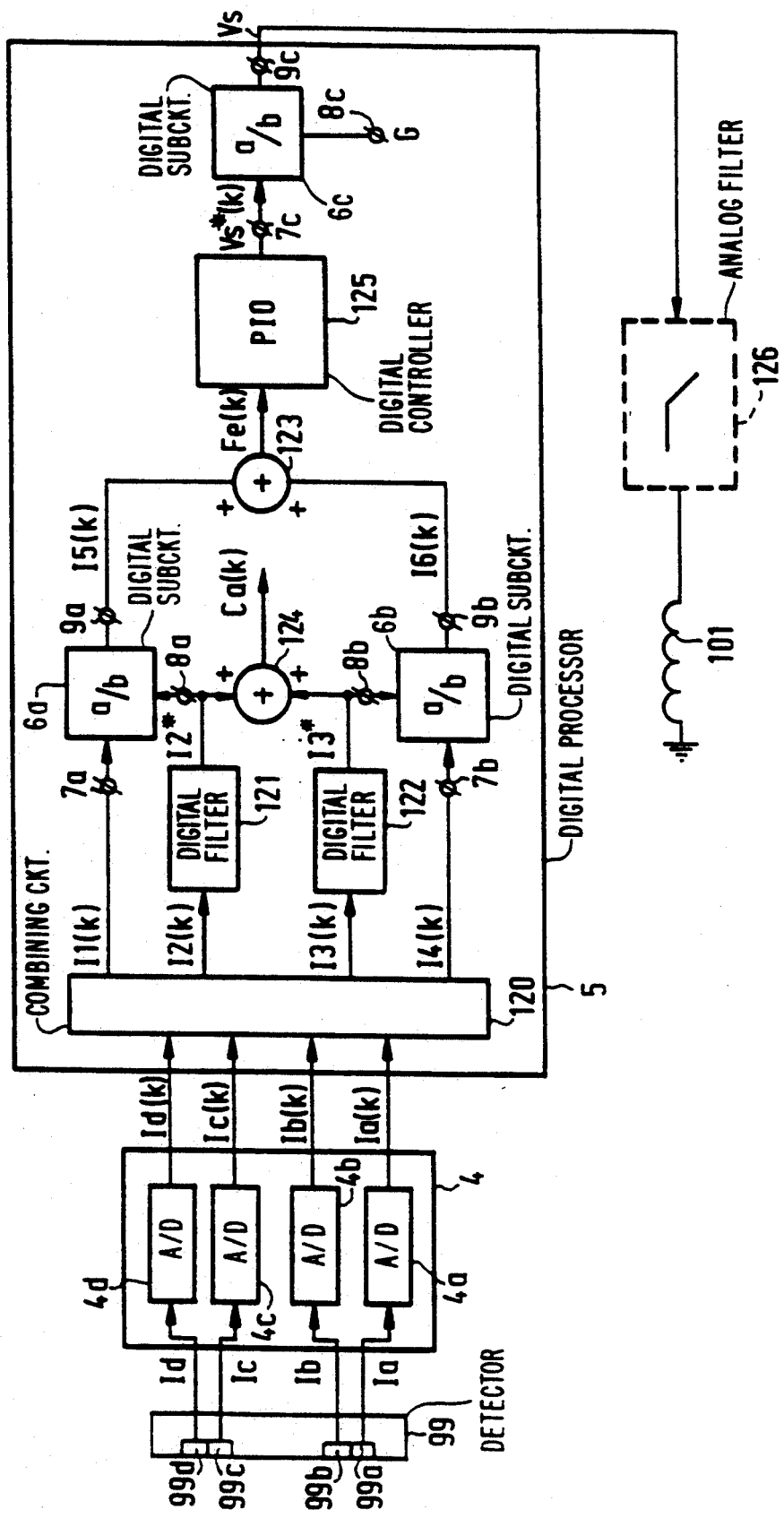

FIG. 10 shows in greater detail the focus control system shown in FIG. 9. In the embodiment shown in FIG. 10 the converter 4 comprises four analog-to-digital converters which include, for example, sigma-delta modulators, for converting the signal currents Ia, Ib, Ic and Id into series of digitized signal values Ia(k), Ib(k), Ic(k) and Id(k). A linear signal combining circuit 120 derives therefrom four series of digital signal values I1(k), I2(k), I3(k) and I4(k) according to the following equations:

$$I1(k) = Id(k) - Ic(k)$$

$$I2(k) = Id(k) + Ic(k)$$

$$I3(k) = Ia(k) + Ib(k)$$

$$I4(k) = Ia(k) - Ib(k).$$

The series of signal values I2(k) and I3(k) are applied to digital low-pass filters 121 and 122 respectively. At the output of the low-pass filter 121 a signal value I2* becomes available which is applied to the input 8a of a sub-circuit 6a of the type in FIG. 2a. The series of signal values I1(k) is applied to an input 7a of the sub-circuit 6a so that a series of signal values I5(k) whose low-frequency component is equal to I1(k)/I2* becomes available at output 9a of the sub-circuit.

In a similar fashion sub-circuit 6b derives a series of signal values I6(k) whose low-frequency component is equal to I4(k)/I3*, where I3* is the low-frequency component of the series of signal values I3(k) which component is determined by the low-pass filter 122. An adder circuit 123 derives from the series of signal values I5(k) and I6(k) a series of signal values Fe(k) whose low-frequency component is indicative of the focus error. An adder circuit 124 derives from the signal value I2*(k) and I3*(k) a sum signal Ca(k) which is indicative of the overall intensity of the reflected beam. A digital controller 125, for example, a PID controller derives from the series of signal values Fe(k) a signal value Vs*(k) according to a predetermined control criterion. The series of signal values Vs*(k) is applied to input 7c of a sub-circuit 6c of the type mentioned above, by means of which the gain of the control loop can be adjusted according to a digital setting value G on input 8c. The series of signal values Vs(k) at output 9c of the sub-circuit 9c may be used for driving the actuator 101. In the case where the number of bits per signal value is greater than one, the signal value is to be converted into an analog signal by means of a digital-to-analog converter so as to enable the actuator to be driven. However, the sub-circuit 6c is preferably to be arranged in such a way that the number of bits per signal value is equal to 1.

In that case the output of the sub-circuit 6c may be used directly for driving the actuator. However, the signal at the output of the sub-circuit 6c is preferably coupled to the actuator 101 through an analog low-pass filter 12b so as to avoid the noise components in the control signal causing unnecessary heat dissipation in the actuator and/or actuator drive circuit.

I claim:

1. A digital control system comprising an actuator for influencing a state variable in a process, a sensor for detecting the state variable, a converter for converting the detected state variable into a series of digital measured signal values produced at an output of said converter, and a digital signal processor coupled to the output of said converter for deriving an actuator control signal from the series of measured signal values; characterized in that the digital signal processor includes a digital subcircuit comprising:

an input terminal for receiving a series of multi-bit digital input signal values a(k) which are related to the measured signal values;

a control terminal for receiving a multi-bit control signal value (b);

an output terminal at which said digital sub-circuit is adapted to produce a series of p-bit digital output signal values o(k) which are related to the quotient of the series of input signal values a(k) divided by the control signal value (b);

multiplier means having respective inputs respectively coupled to said output terminal and to said control terminal to receive the series of output signal values o(k) and the control signal value (b), and being adapted to produce the product thereof as a series of multi-bit signal values at an output of said multiplier means;

comparator means having an input coupled to said input terminal of the subcircuit to receive the series of input signal values a(k) and a further input coupled to the output of said multiplier means to receive the series of signal values produced thereat, and having an output at which said comparator means is adapted to produce the difference between the signal values at the inputs thereof, said difference being a series of multi-bit digital error signal values e(k);

digital filter means having an input coupled to the output of said comparator means to receive said series of multi-bit error signal values e(k) and being adapted to digitally filter such series so as to derive a series of filtered multi-bit error signal values at an output of said digital filter means; and quantizing means coupled to the output of said digital filter means to receive said series of filtered error signal values and being adapted to quantize said series so as to derive a series of quantized p-bit error signal values at an output of said quantizing means, said output thereof being coupled to said output terminal of said subcircuit, said series of quantized error signal values constituting said series of output signal values o(k);

the digital signal processor further being characterized in that it comprises means coupled to the output terminal of said subcircuit for deriving said actuator control signal from said series of output signal values o(k) at said output terminal.

2. A control system as claimed in claim 1, characterized in that the output of the quantizing means is coupled to the output terminal of the subcircuit by a circuit for inverting the sign of the quantized signal samples produced by the quantizing means in response to an inversion of the sign of the control signal value (b) at the control terminal of the subcircuit.

3. A control system as claimed in claim 1, characterized in that the input terminal of the subcircuit is coupled to the output of said converter, and further comprising: a control circuit coupled to the output terminal of the subcircuit for deriving a series of control signal values from the series of output signal values o(k); and means for converting said series of control signal values into said actuator control signal.

4. A control system as claimed in claim 1, characterized in that p is equal to 1.

5. A control system as claimed in claim 4, characterized in that the output terminal of the sub-circuit is coupled to said actuator only by an analog signal path.

6. A control system as claimed in claim 5, characterized in that the output terminal of the sub-circuit is coupled to said actuator by a low-pass filter.

* * * * *